USOO5535593A

United States Patent [19]
Wu et al.

[11] Patent Number: 5,535,593
[45] Date of Patent: Jul. 16, 1996

[54] APPARATUS AND METHOD FOR TEMPERATURE CONTROL OF A CRYOCOOLER BY ADJUSTING THE COMPRESSOR PISTON STROKE AMPLITUDE

[75] Inventors: Yeong-Wei A. Wu, Rancho Palos Verdes; Michael H. Kieffer, Redondo Beach, both of Calif.

[73] Assignee: Hughes Electronics, Los Angeles, Calif.

[21] Appl. No.: 293,621

[22] Filed: Aug. 22, 1994

[51] Int. Cl.[6] .................................. F25B 9/00; F25B 1/00
[52] U.S. Cl. .................................................. 62/6; 62/228.5
[58] Field of Search ........................ 62/6, 228.5, 228.4; 60/520

[56] References Cited

U.S. PATENT DOCUMENTS

| 5,156,005 | 10/1992 | Redlich | 62/6 |
| 5,167,124 | 12/1992 | Lucas | 62/6 |
| 5,245,830 | 9/1993 | Aubrun et al. | 62/6 |

Primary Examiner—William E. Wayner
Attorney, Agent, or Firm—Michael W. Sales; Wanda K. Denson-Low

[57] ABSTRACT

A temperature control apparatus and method for active control of a Stirling-cycle cryocooler cold finger tip temperature, by adjusting the cryocooler compressor piston stroke amplitude. In a control loop of the Stirling cryocooler, having a compressor in which the pistons are reciprocated by linear motors at fundamental frequency and the length of a stroke of the piston is varied as a direct function of cryocooler temperature, temperature is sensed at the cryocooler cold finger tip and the temperature signal is compared with a set temperature signal to produce a temperature error signal. This signal is input in a PID control law module which uses proportional, derivative, and integrated temperature error information to generate the required compressor piston stroke amplitude change for achieving the precision temperature control. The resulting signal is further processed in a distribution law module that distributes the desired piston stoke amplitude change to each compressor motor so that the force balance at the fundamental frequency is maintained.

17 Claims, 5 Drawing Sheets

APPARATUS AND METHOD FOR TEMPERATURE CONTROL OF A CRYOCOOLER BY ADJUSTING THE COMPRESSOR PISTON STROKE AMPLITUDE

BACKGROUND OF THE INVENTION

1. Field of the Invention

This invention relates generally to a temperature control apparatus and method for active control of a Stirling-cycle cryocooler cold finger tip temperature, by adjusting the cryocooler compressor piston stroke amplitude, and more particularly, to a temperature control apparatus and method with a PID (proportional/integral/derivative) control law that uses proportional, derivative, and integrated temperature error information to generate the required compressor piston stroke amplitude change for achieving the precision temperature control, followed by a distribution law that distributes the desired piston stoke amplitude change to each compressor motor so that the force balance at the fundamental frequency is maintained.

2. Description of the Related Prior Art

A primary application for cryocoolers is with superconductive electronic devices and electro-optical devices, operated at cryogenic temperatures. Due to the fact that their electrical resistance is very low and they are extremely sensitive to magnetic radiation, superconductor electronic devices must be operated at very low temperatures and in low magnetic fields.

Many refrigeration systems utilizing Stirling-cycle apparati have been developed for cryogenic cooling. Representative of the U.S. Patents relating to cryogenic cooler apparati are U.S. Pat. Nos. 5,245,830; 5,146,750; 5,032,72; 4,606,194; 4,429,732; 4,413,473; 4,413,474; 4,413,475; 4,078,389. In general, these apparati may be described as systems where the fluid, such as helium, is initially cooled by passing through a regenerator, while maintaining high pressure, and then finally cooling the initially cooled fluid through expansion and discharge.

The performance of many detector devices, used for detection or measurement of very small incident signals, is enhanced by reducing the temperature. Infra-red detectors and similar heat-sensitive instruments have dramatically increased the need for cryogenic cooler apparati, since without cooling, the infra-red (IR) signal of distant IR sources will be masked by heat energy. Thus, cryogenic coolers, capable of continuously maintaining the required cryogenic temperature, are an essential component of space-borne infra-red (IR) surveillance sensors. In order to maintain optimal signal to noise ratio, these detectors have to be cooled to cryogenic temperature.

To optimize their IR sensitivity performance, the temperature at the IR focal plane array needs to be precisely controlled. Controlling the focal plane array temperature using an additional active thermal device, such as a heater, seems to be a simple solution. However, this approach requires additional hardware and electrical power which may not be desirable for space applications with stringent weight and power constraints. Another major problem in applying the cryocoolers to sensitive focal-plane instruments is the vibration induced by the reciprocating motion of internal components in both the cryocooler compressor and expander. If unbalanced, the motors in compressor and expander produce large forces which, in nearly all cases, are excessive for spacecraft and sensors.

Moreover, cryocoolers must be able to efficiently control space-borne IR focal plane arrays without creating vibration disturbances that would impair sensor performance. Therefore, the performance of the cryocoolers are dictated by thermodynamics and vibration consideration.

The pistons of the Stirling cryocoolers are typically powered by linear, electric drive motors which drive the pistons in reciprocation. The rate at which heat is pumped by the Stirling cooler, and thus the temperature of the system, is a continuous function of the piston displacement. Therefore, it is desirable to control the piston displacement as a function of temperature of the refrigerated cold finger tip, in order to stabilize the temperature within specific limits.

The control of the piston displacement is accomplished by controlling the drive signal applied to the cryocooler motor via feedback control loop. Conventional analog feedback controls, designed to reduce and/or to eliminate the temperature error, feed an analog error signal into a control loop. However, since the analog feedback control loop may not function satisfactorily, digital feedback control circuit utilization became necessary and possible with the appearance of the digital computers.

The approach of adjusting the compressor piston stroke amplitude to control the cold finger tip temperature had been previously investigated by Robert R. Clappier and Robert J. Kline-Schoder, of the Lockheed Missiles & Space Company, Inc., and described in their paper "Precision Temperature Control of Stirling-cycle Cryocoolers," 1993 Cryogenic Engineering Conference, Albuquerque, N.M., Jul. 12–16, 1993. However, the temperature control algorithm developed by Lockheed does not deal with the fundamental frequency vibration control which is one of the critical requirements for a high performance space-borne IR sensor.

Another approach of adjusting the compressor piston stroke amplitude to control the cold finger tip temperature had been previously investigated by J. N. Aubrun, R. R. Clappier et al. and described in their paper "A High-Performance Force Cancellation Control System for Linear Drive Split-Cycle Stirling Cryocoolers," CEC Conference Proceedings (11–14 Jun. 1991). However, this method uses two back-to-back compressors with a hybrid digital/analog control system where the pistons' movements are modulated proportionally, by following identical waveforms. It does not provide a distribution law module that distributes the desired piston stroke amplitude change to each compressor motor so that the force balance at the fundamental frequency is maintained.

U.S. Pat. No. 5,245,830, issued to Aubrun, illustrates an adaptive control for reducing control system error to near zero, by feeding forward in time a correction, in order to deal with a problem before it happens. The invention smooths, by a local averaging process, the effect of random noise. The adaptive control system measures, during a cycle of operation, the error between a desired cycle command and an output signal representing actual system operation. The smoothed, time shifted, error correction data is converted and combined with the desired cycle command to produce an adapted desired cycle command for reducing control system error to near zero. However, this method does not simultaneously control the cold finger tip temperature and balance the fundamental frequency vibration forces.

OBJECTS AND SUMMARY OF THE INVENTION

The present invention overcomes the pitfalls of the methods and apparati utilized in the prior art. The temperature control algorithm developed in this invention can simultaneously control the cold finger tip temperature and balance the fundamental frequency vibration forces.

It is therefore an object of the present invention to provide an apparatus and method for active adjustment of the compressor piston stroke amplitude to control the cold finger tip temperature.

It is therefore another object of the present invention to provide a temperature control apparatus and method to control the cold finger tip temperature and at the same time to balance the fundamental frequency vibration forces by adjusting the compressor piston stroke amplitudes.

In general, one embodiment of the present invention is a temperature control system of a cryocooler, continuously adjusting compressor piston stroke amplitude as a function of temperature error, so that the cryocooler forces are balanced at the compressor fundamental drive frequency, comprising: input sinusoidal signal means for generating an input sinusoidal signal of a frequency the same as the fundamental frequency of the compressor motor; error measuring means for continuous measuring in each cycle of operation the temperature error between a measured compressor temperature and a set temperature; PID (proportional/integral/derivative) controller means for calculating in each cycle of operation a required stroke amplitude adjustment as a sum of a proportional signal component, a derivative signal component and an integral signal component of the temperature error; distribution law means for calculating for each compressor piston a compressor stroke amplitude adjustment as a function of said required stroke amplitude adjustment; and combining means for combining in each cycle of operation each said compressor stroke amplitude adjustment with the amplitude of the input sinusoidal signal to produce a corresponding amplitude of a compressor motor stroke command.

Another embodiment of the present invention is a dual, opposed Stirling-cycle cryocooler with a cold finger tip, having compressor pistons reciprocated by linear motors at the fundamental drive frequency, in which temperature is controlled by continuously adjusting stroke movement of compressor pistons as a function of temperature error, so that the cryocooler forces are balanced at the compressor fundamental drive frequency, comprising: input sinusoidal signal means for generating an input sinusoidal signal of a frequency the same as the fundamental frequency of the compressor motor; error measuring means for continuous measuring in each cycle of operation the temperature error between the compressor temperature measured on the cold finger tip and a set temperature; PID controller means for calculating in each cycle of operation a required stroke amplitude adjustment as a sum of a proportional signal component, a derivative signal component and an integral signal component of the temperature error; distribution law means for calculating for each compressor piston a compressor stroke amplitude adjustment as a function of said required stroke amplitude adjustment; combining means for combining in each cycle of operation each said compressor stroke amplitude adjustment with the amplitude of the input sinusoidal signal to produce a corresponding amplitude of a compressor motor stroke command wherein the compressor motor stroke command frequency is the same as the frequency of the input sinusoidal signal; and feedback means for generating a feedback signal for adjusting the position of each compressor piston in response to the compressor motor stroke command.

Yet another embodiment of the present invention is a temperature control method for controlling the temperature of a cryocooler, continuously adjusting compressor piston stroke amplitude as a function of temperature error, so that the cryocooler forces are balanced at the compressor fundamental drive frequency, comprising the following steps: generating an input sinusoidal signal of a frequency the same as the fundamental frequency of the compressor motor; continuously measuring in each cycle of operation the temperature error between a measured compressor temperature and a set temperature; calculating in each cycle of operation a required stroke amplitude adjustment as a sum of a proportional signal component, a derivative signal component and an integral signal component of the temperature error; calculating in a distribution law module for each compressor piston a compressor stroke amplitude adjustment as a function of said required stroke amplitude adjustment; and combining in each cycle of operation each said compressor stroke amplitude adjustment with the amplitude of the input sinusoidal signal to produce a corresponding amplitude of a compressor motor stroke command.

Still another embodiment of the present invention is a temperature control method for active control of a Stirling-cycle cryocooler cold finger tip temperature, continuously adjusting compressor piston stroke amplitude as a function of temperature error, so that the cryocooler forces are balanced at the compressor fundamental drive frequency, continuously repeating steps the following steps: sensing temperature at the cryocooler cold finger tip; comparing the temperature obtained. with a set temperature to produce a temperature error; imputing the temperature error in a PID controller module which uses proportional, derivative, and integral temperature error information to generate a required compressor stroke amplitude adjustment; processing the required compressor stroke amplitude adjustment in a distribution law module that distributes a compressor stroke amplitude adjustment to each compressor motor so that the force balance at the fundamental frequency is maintained; combining in each cycle of operation each said compressor stroke amplitude adjustment with the amplitude of the input sinusoidal signal to produce a corresponding amplitude of a compressor motor stroke command; generating a feedback signal in feedback circuit for adjusting the position of each compressor piston in response to the compressor motor stroke command; and varying piston stroke length as a direct function of the cryocooler temperature and the compressor motor stroke command, at the fundamental frequency.

The novel features of construction and operation of the invention will be more clearly apparent during the course of the following description, reference being had to the accompanying drawings, wherein there has been illustrated a preferred form of the device of the invention and wherein like characters of reference designate like parts throughout the drawings.

DESCRIPTION OF THE PREFERRED EMBODIMENT

The following detailed description is of the best presently contemplated mode of carrying out the present invention. This description is not intended in a limiting sense, but is made solely for the purpose of illustrating the general principles of the invention.

Figure 1:
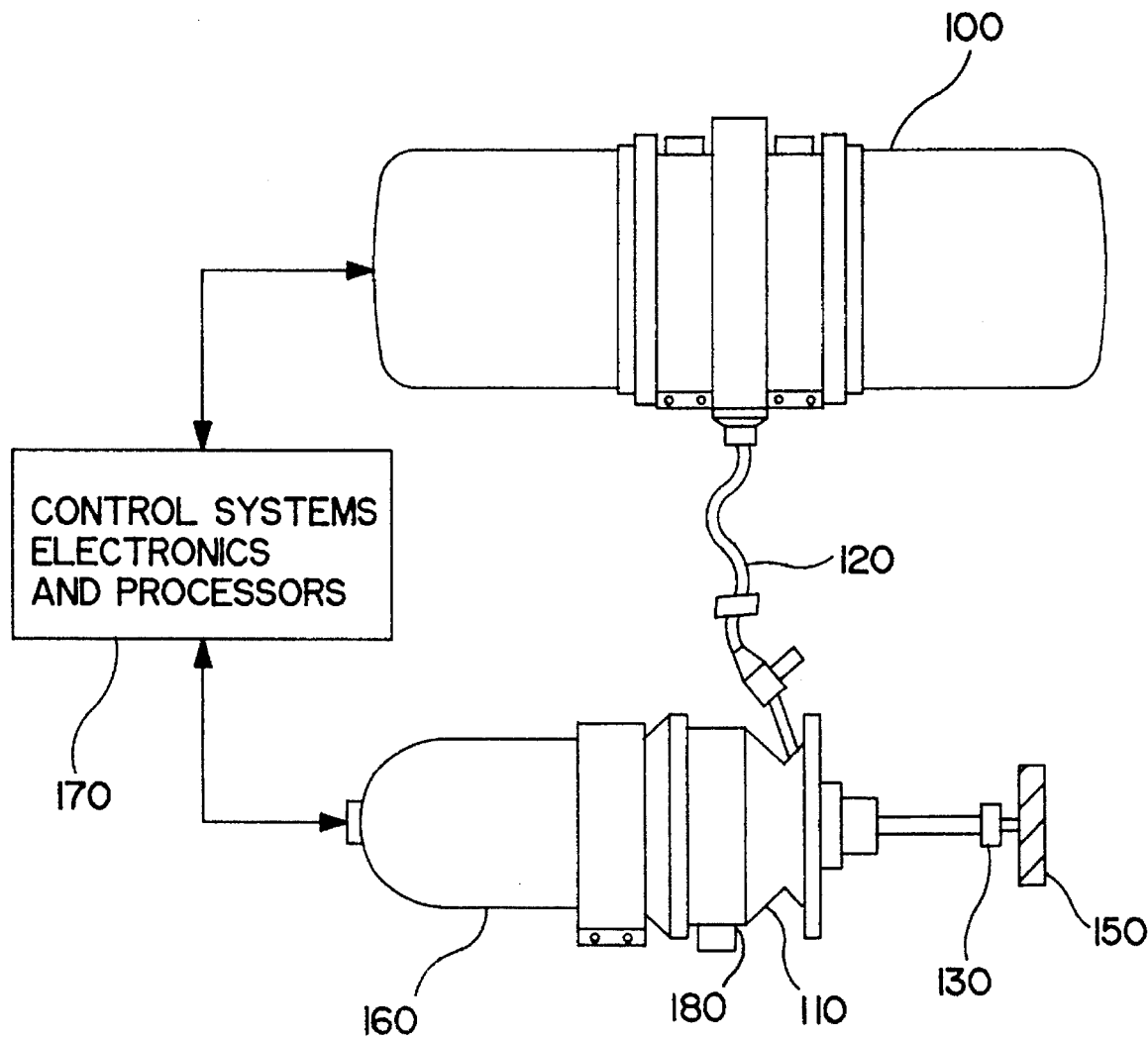
FIG. 1 is a schematic diagram illustrating a Stirling-cycle cryocooler with the control systems, constructed in accordance with the embodiment of the present invention.
Figure 2A:
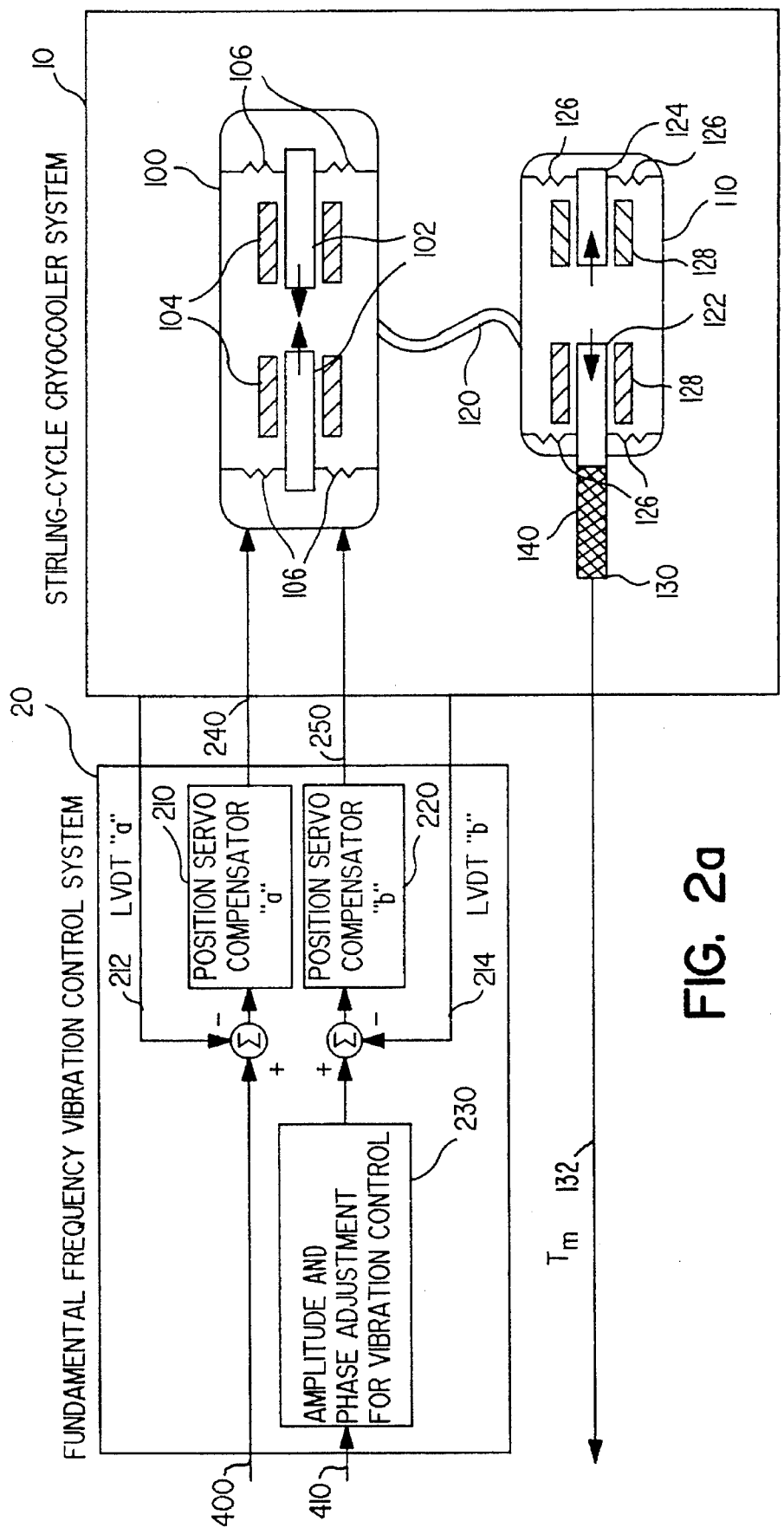
FIG. 2a is a block diagram view showing details of the cryocooler and fundamental frequency vibration component of the control systems, shown in FIG. 1, constructed in accordance with the embodiment of the present invention.
Figure 2B:
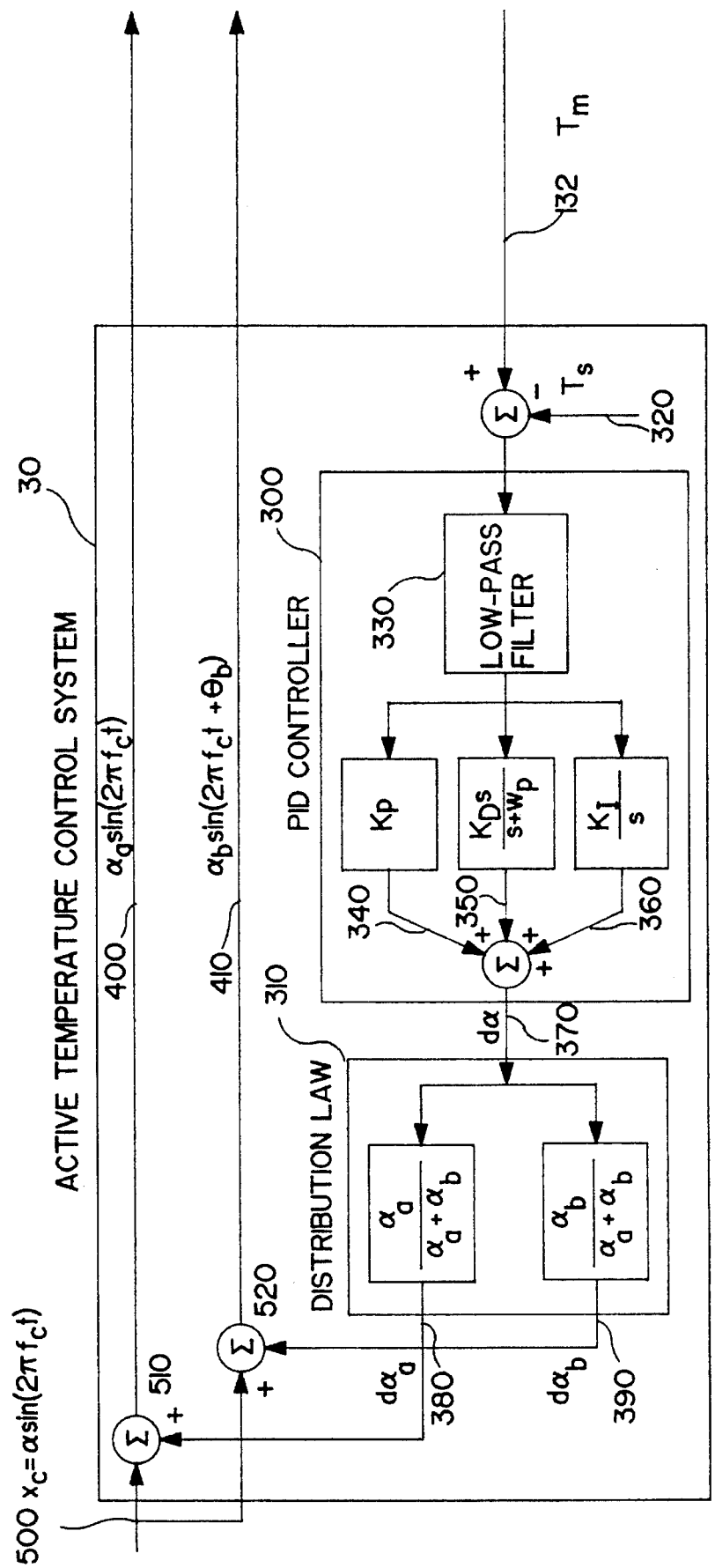
FIG. 2b is a block diagram view of an active temperature control system, another component of the control systems presented in FIG. 1, constructed in accordance with the embodiment of the present invention.

The present invention relates to a Stirling-cycle cryogenic cooling apparatus, required for long-lifetime space-borne instruments such as infra-red detectors. Referring now to the drawings in detail, wherein like numerals indicate like elements, there is shown in FIG. 1, FIG. 2a and FIG. 2b a preferred apparatus, constructed in accord with the present invention. Moreover, FIG. 2a and FIG. 2b illustrate how the method steps are sequenced and operatively associated with one another.

Except for control systems electronics and processors 170 component, the Stirling-cycle cryogenic cooling apparatus, shown in FIG. 1, consists of a Stirling-cycle cryocooler system 10, with a cold finger tip 130 and focal plane array 150, a construction which is well known in the art.

As illustrated in greater detail in FIG. 2a, the Stirling-cycle cryocooler system of the preferred embodiment consists of three basic modules: a compressor 100 with two pistons 102, an expander 110 with a cold finger tip 130, and a helium transfer line 120 for thermodynamic coupling. As shown in detail in FIG. 2a and FIG. 2.b, the control systems electronics and processors 170 module, shown in FIG. 1, has two control systems: a fundamental frequency vibration control system 20 and an active temperature control system 30. The fundamental frequency vibration control system 20 functions to control unbalanced forces of a piston control loop. The active temperature control system 30 incorporates a PID (proportional/integral/derivative) controller module 300 and a distribution law module 310.

The cryocooler compressor 100 of the preferred embodiment consists of two pistons 102 which are mechanically placed in a dual-opposed back-to-back configuration and commanded to move in opposite directions by linear compressor motors 104 at the fundamental frequency, in order to cancel the vibration forces. Helical springs 106 are used for flexural piston support and to maintain alignment of the pistons 102 during reciprocating motion of the pistons 102.

The cryocooler expander 110 of the preferred embodiment consists of a displacer 180 with a displacer piston 122, balanced with a balance mass 124 in balancer 160, and expander motors 128. Expander helical springs 126 are used to maintain alignment of the displacer pistons 122 during reciprocating motion of the displacer piston 122 and the balance mass 124. As the motors' 104 shafts rotate, the pistons 102 compress and expand helium gas and the helium pressure wave is transmitted through the helium transfer line 120 to the gap between the displacer 180 and the cold finger tip 130. A regenerator 140 is used for initial cooling of the helium.

Both the compressor 100 and the expander 110 modules have been designed to achieve a low vibration level by incorporating the opposed balance mass 124, within the expander 110, in order to obtain a near perfect balance of all active forces, such as pressure forces, motor electromechanical forces, dynamic reaction of the moving masses, spring forces, motor current lead spring forces, dissipative forces due to eddy currents in the motor, etc. Due to the nonlinear nature of the fluid dynamics involved, both the compressor 100 and the displacer 180 motions must be actively controlled. In addition, to provide vibration cancellation, the motion of one system must be precisely compensated by another system.

The compressor fundamental frequency vibration forces of the preferred embodiment are kept in balance with a dual-opposed position motion controlled by two position servo compensators 210 and 220, illustrated in FIG. 2a. The amplitude and phase of a commanded fundamental drive signal "b" 250 to the compressor motor 104, compensated by the position servo compensator "b") 220, are previously adjusted in an amplitude and phase adjustment for vibration control module 230, to produce a near perfect force cancellation at the fundamental drive frequency. The fundamental frequency vibration control system 20, therefore, is essentially a force feedback controller which performs the force imbalance suppression function and can relax some manufacturing tolerance requirements, such as suspension system stiffness and motor parameters. A digital implementation of the feedback control loop was chosen because the precision required in generating and controlling the amplitude and phase of the motor 104 drive sine waves would be difficult to accomplish with analog electronics. The feedback control loop continuously adjusts compressor pistons' 102 stroke amplitudes as a function of a temperature error, as described below.

The commanded fundamental drive signals "a" 240 and "b" 250 are sinusoidal signals of a constant frequency, the fundamental frequency of the compressor 100, with variable amplitudes, determined in the fundamental frequency vibration control system 20 and in the active temperature control system 30. These amplitudes determine the length of the stroke of the compressor pistons 102 and are determined by the temperature error.

Two Linear Variable Displacement Transformers (LVDT), not shown, in the fundamental frequency vibration control system 20, function as piston position sensing devices. The detected linear motor signals LVDT "a" 212 and LVDT "b" 214 are continuously fed back from the Stirling-cycle cryocooler system 10, and subtracted from a compressor motor "a" stroke command 400 and a compressor motor "b" stroke; command 410, previously adjusted in the amplitude and phase adjustment for vibration control module 230. The compressor motor "a" stroke command 400 and compressor motor "b" stroke command 410, described below in regard to FIG. 2b, are representatives of the correction required to obtain and then to maintain the cryocooler temperature represented by a set temperature Ts 320. The resulting signal is then sent to the position servo compensators 210 and 220, to produce two commanded fundamental drive signals "a" 240 and "b" 250, as the inputs of the compressor motors 104.

Active Temperature Control System

There are several parameters that can be actively adjusted to control the cold finger tip 130 temperature. Among them are compressor stroke, expander stroke, and phasing between these two parameters. In the present invention, the compressor stroke is used as an adjusting parameter for temperature control because of its effectiveness and linearity with the amount of heat pumped.

In the active temperature control system 30, as shown in FIG. 2b, an input sinusoidal signal 500 at the fundamental frequency of the compressor motor is produced by a sine wave drive, not shown. The active temperature control system 30 continuously computes the temperature error, which is the difference between a measured cold finger tip 130 temperature Tm 132 and the set temperature Ts 320. The computed temperature error is then filtered with a low-pass filter 330 to remove the high frequency noise present in the measured temperature Tm 132.

The filtered temperature error is then applied to the PID controller module 300, in the active temperature control system 30, described below, and processed to produce proportional signal component 340, integral signal component 360, and derivative signal component 350, in each cycle of the operation and in a manner well known in the art for control systems.

In conventional digital controllers, the output is usually computed from the error signal at sampling time by an equation, representing a proportional integral derivative algorithm, containing three terms:

1. a proportional term, $K_p e_n$, where $K_p$ is a constant, the "proportional gain",
2. a difference or derivative term, $K_D(e_n - e_{n-1})T$, where $K_D$ is a constant, the derivative time, and T is the sampling period,
3. a summation or integral term, $$T * K_I \sum_{i=0}^{n} e_i,$$

where T is the sampling period.

The output of the PID controller module 300 is the sum of the values of these three terms, after multiplication of the derivative term with a derivative gain $K_D$, and multiplication of the integral term with an integral gain $K_I$. The proper parameter values of sampling period T and proportional, derivative and integral gains $K_p$, $K_D$ and $K_I$ depend upon the process being controlled, and the adjustment of these constants to their proper values is accomplished by tuning.

Derivative compensation is used to accomplish short term system stability and the derivative term is produced by subtracting the temperature error sample obtained in the previous iteration from the current temperature error. Integral compensation is used to accomplish long term system stability, by reduction of the error temperature to zero. It is accomplished by accumulating several error samples over time and multiplying their sum by an integral gain.

The required stroke amplitude adjustment dα 370 is computed in the PID controller module 300 as a summation of three signals: a proportional signal component 340 which is proportional to the filtered temperature error, a derivative signal component 350, proportional to the derivative of the filtered temperature error for short term stability, and an integral signal component 360, proportional to the integral of the filtered temperature error, for long term stability. The derivative signal component 350 has a low-pass filter incorporated into its s-plane transfer function, with a corner frequency $\omega_p$ of 5 Hz, to provide further noise reduction. The sum of the three PID terms is further passed through a low-pass filter, not shown, with a corner frequency of 0.5 Hz. The constant parameters $K_p$, $K_D$, $K_I$, and $\omega_p$ are specifically tuned for each individual cryocooler in order to satisfy the desired settling time and temperature accuracy requirements.

The distribution law module 310 computes the desired stroke amplitude change for each compressor piston 102 in each cycle so that the force balance at the fundamental frequency is always maintained. The distribution law of the present invention was developed based on the following equations.

Each moving mass is subject to a set of forces as defined by Newton's law. A force that moves the compressor piston 102 is, in general, a function of the relative piston displacement and is the same force that moves the whole cryocooler, producing the undesired vibration. $F_a$ and $F_b$ denote the fundamental frequency forces generated by the compressor motor "a" 104 and the compressor motor "b" 104, respectively, with the compressor motor "a" stroke command 400 given by equation:

$$X_{ac} = \alpha_a \sin(2\pi f_c t) \tag{1}$$

and the compressor motor "b" stroke command 410 given by equation:

$$X_{bc} = \alpha_b \sin(2\pi f_c t + \theta_b) \tag{2}$$

where $f_c$ is the fundamental stroke frequency, $\alpha_b$ and $\theta_b$ are the amplitude and phase adjustments calculated in the amplitude and phase adjustment for vibration control module 230, and $\alpha_a$ is the compressor motor "a" 104 stroke amplitude.

The forces $F_a$, $F_b$ are given by equations:

$$F_a = m_a \ddot{x}_a = m_a (2\pi f_c)^2 g_a \alpha_a \sin(2\pi f_c t + \phi_a) \tag{3}$$

$$F_b = m_b \ddot{x}_b = m_b (2\pi f_c)^2 g_b \alpha_b \sin(2\pi f_c t + \theta_b + \phi_a) \tag{4}$$

where $m_a$ is a mass of compressor motor "a" 104, $m_b$ is a mass of compressor motor "b" 104, $g_a$, $g_b$ are the piston control loop servo gains, and $\phi_a$, $\phi_b$ are the piston control loop servo phases.

In order to eliminate vibration, the displacer 180 and compressor 100 have to be carefully balanced by using opposing and counterbalanced masses, in which case the net fundamental frequency force $F = F_a + F_b$ becomes zero.

With this assumption, and by knowing the constant parameters: $m_a$, $m_b$, $g_a g_b$, $\phi_a$, $\phi b$, the desired amplitude oeu and phase, $\theta_b$, can be chosen as follows:

$$m_a g_a \alpha_a = m_b g_b \alpha_b$$

$$\phi_a = \phi_b + \theta_b + \pi$$

or $$\alpha_b = \frac{m_a g_a \alpha_a}{m_b g_b} \tag{5}$$

$$\theta_b = (\phi_a - \phi_b) - \pi \tag{6}$$

If the stroke amplitude adjustments $d\alpha_a$ 380 and $d\alpha_b$ 390 are determined so that the new stroke amplitudes: $\alpha_a(+)$, $\alpha_b(+)$ given by:

$$\alpha_a(+) = \alpha_a + d\alpha_a \tag{7}$$

$$\alpha_b(+) = \alpha_b + d\alpha_b \tag{8}$$

satisfy:

$$\frac{\alpha_b(+)}{\alpha_a(+)} = \frac{m_a g_a}{m_b g_b} \tag{9}$$

then the condition (5) is satisfied after the adjustments and the fundamental frequency force is balanced. It can be shown that if stroke amplitude adjustments $d\alpha_a$ 380 and $d\alpha_b$ 390 are given by equations:

$$d\alpha_a = \left( \frac{\alpha_a}{\alpha_a + \alpha_b} \right) d\alpha \quad (10)$$

$$d\alpha_b = \left( \frac{\alpha_b}{\alpha_a + \alpha_b} \right) d\alpha \quad (11)$$

then $$\frac{\alpha_b(+)}{\alpha_a(+)} = \frac{\alpha_b \left(1 + \frac{d\alpha}{\alpha_a + \alpha_b}\right)}{\alpha_a \left(1 + \frac{d\alpha}{\alpha_a + \alpha_b}\right)} = \frac{\alpha_b}{\alpha_a} = \frac{m_a g_a}{m_b g_b}$$

which indicates that the condition (5) is satisfied. Hence, the equations (10) and (11) are describing distribution law gain factors of the distribution law module 310, for compressor motors 104 "a" and "b", as shown in boxes in FIG. 2b.

Next, the summing junctions 510 and 520, as illustrated in top left corner in FIG. 2b, combine the correction signal compressor stroke amplitude adjustments $d\alpha_a$ 380 and $d\alpha_b$ 390 with the amplitude of the input sinusoidal signal 500, at the fundamental frequency, in order to send new and compensated compressor motor "a" stroke command 400 and compressor motor "b" stroke command 410 to the compressor motors 104 and to modify the position of the pistons 102 in next iteration, so that the cooler remains mechanically resonant.

The present invention also embodies a temperature control method for active control of the Stirling-cycle cryocooler cold finger tip 130 temperature Tm, by adjusting the cryocooler compressor piston 102 stroke amplitude, which includes the following steps, illustrated in FIG. 2a and FIG. 2b. In a control loop of the Stirling cryocooler, having the compressor 100 in which the pistons 102 are reciprocated by linear motors 104, at the fundamental frequency, and the length of a stroke of the piston 102 is varied as a direct function of cryocooler temperature, temperature is sensed at the cryocooler cold finger tip 130. The obtained temperature Tm 132 is compared with the set temperature Ts 320 to produce the temperature error signal.

The temperature error signal is input in the PID controller module 300 which uses proportional, derivative, and integral temperature error information to generate the required compressor stroke amplitude adjustment $d\alpha$ 370, for achieving the precision temperature control. The resulting signal is further processed in the distribution law module 310 that calculates for each compressor piston 102 the compressor stroke amplitude adjustment $d\alpha_a$ 380 and $d\alpha_b$ 390. These signals are further combined with the amplitude of the input sinusoidal signal 500 to produce a corresponding amplitude of a compressor motor stroke command 400 and 410 and the compressor motor stroke commands 400 and 410 is distributed to each compressor motor 104 so that the force balance at the fundamental frequency is maintained.

The feedback signal is generated in the feedback loop for adjusting the position of each compressor piston 102 in response to the compressor motor stroke commands 400 and 410 and piston 102 stroke length is varied as a direct function of the cryocooler temperature and the compressor motor stroke command 400 and 410. The calculating, in the distribution law module 310, the compressor stroke amplitude adjustment 400 and 410 includes calculating the distribution law gain factor for each compressor motor 104, proportional to the amplitude of said compressor motor stroke command 400 and 410. The generating the feedback signal in the feedback loop further includes generating the linear motor LVDT (Linear Variable Displacement Transformer) "a" and "b" signal 212 and 214, for each said compressor piston 102, and further includes adjusting the amplitude and phase of compressor motor "b" 104, in the fundamental frequency vibration control module 30, to compensate for the vibrations of the compressor 100 in order to produce a near perfect force cancellation at the fundamental drive frequency.

Software Implementation and Experimental Results

Implementation of the active temperature control method used in the preferred embodiment of the invention is accomplished by software programs, not shown, executing on processors in the control systems electronics and processors 170 module. The active temperature control algorithm of the preferred embodiment, modified to discrete difference equations, is implemented in two processors, shown in FIG. 1 as a part of the control systems electronics and processors 170 module. A Digital Signal Processor (DSP) is used in the preferred embodiment to perform the cold finger tip temperature acquisition, the temperature low-pass filtering function, shown in FIG. 2b as the low-pass filter 330, and the compressor piston' stroke amplitude updates. The DSP sampling rate of the preferred embodiment is set at 4 KHz and the fundamental stroke frequency is chosen to be 32 Hz. A 68000-based CPU processor performs the computations of the temperature error, as well as the computations of the proportional/integral/derivative and the distribution law equations, as defined by equations (10) and (11), described above. Its sampling rate is set at a 100 Hz rate, in the preferred embodiment, and is a result of a compromise between the throughput of the CPU used in the system, and the sample rate necessary for satisfactory derivative term performance.

The following system parameters have to be empirically determined. The values used in the particular implementation of the preferred embodiment described below were: the PID proportional, integral and derivative gains $K_p$=0.039, $K_I$=(0.039)*0.00001 and $K_D$=5.02; the corner frequency $\phi_p$=2$\pi$(10), the transfer function H(s) of the additional low-pass filter, not shown, at the output of the PID controller 300, $$H(s) = \frac{2\pi(0.5)}{s + 2\pi(0.5)}$$

The objective of the test was to evaluate the cryocooler active temperature control and vibration control performance, in regard with the present invention.

Listed below are the conditions that were set during the data collection:
Cold finger tip set temperature: 59.8K
Thermal load: 1 watt
Nominal Compressor stoke: 8.75 mm
Expander stroke: 2.00 mm
Thermodynamic phase: 69 degrees
Fundamental stroke frequency: 32 Hz
Vacuum pressure: 1 mm torr Both the general-purpose 68000-based CPU processor and the 2100-based DSP were used to implement the temperature control algorithm, in accordance with the preferred embodiment. The DSP sampling rate was set at 4 KHz. DSP performed the temperature error computation, the low-pass filtering function and the compressor piston' stroke amplitude updates. The 68000-based CPU processor sampling rate was set at a 100 Hz rate. This processor performed the computations of the proportional/integral/derivative equation and the distribution law equations, as defined by equations (10) and (11), described above.

Following are empirically determined system parameters, used in the described particular implementation. The PID gains $K_p$, $K_I$, $K_D$, and the corner frequency $\phi_p$ were chosen as follows: $K_p$=0.039; $K_I$=(0.039)*0.00001; $K_D$=5.02; $\phi_p$=2π(10). The transfer function of the low-pass filter 330, shown in FIG. 2b, H(s), was chosen as:

$$H(s) = \frac{2\pi(0.5)}{s + 2\pi(0.5)}$$

The conventional bilinear transformation with frequency pre-warping technique was applied to convert all the differential equations into difference equations.

Figure 3:
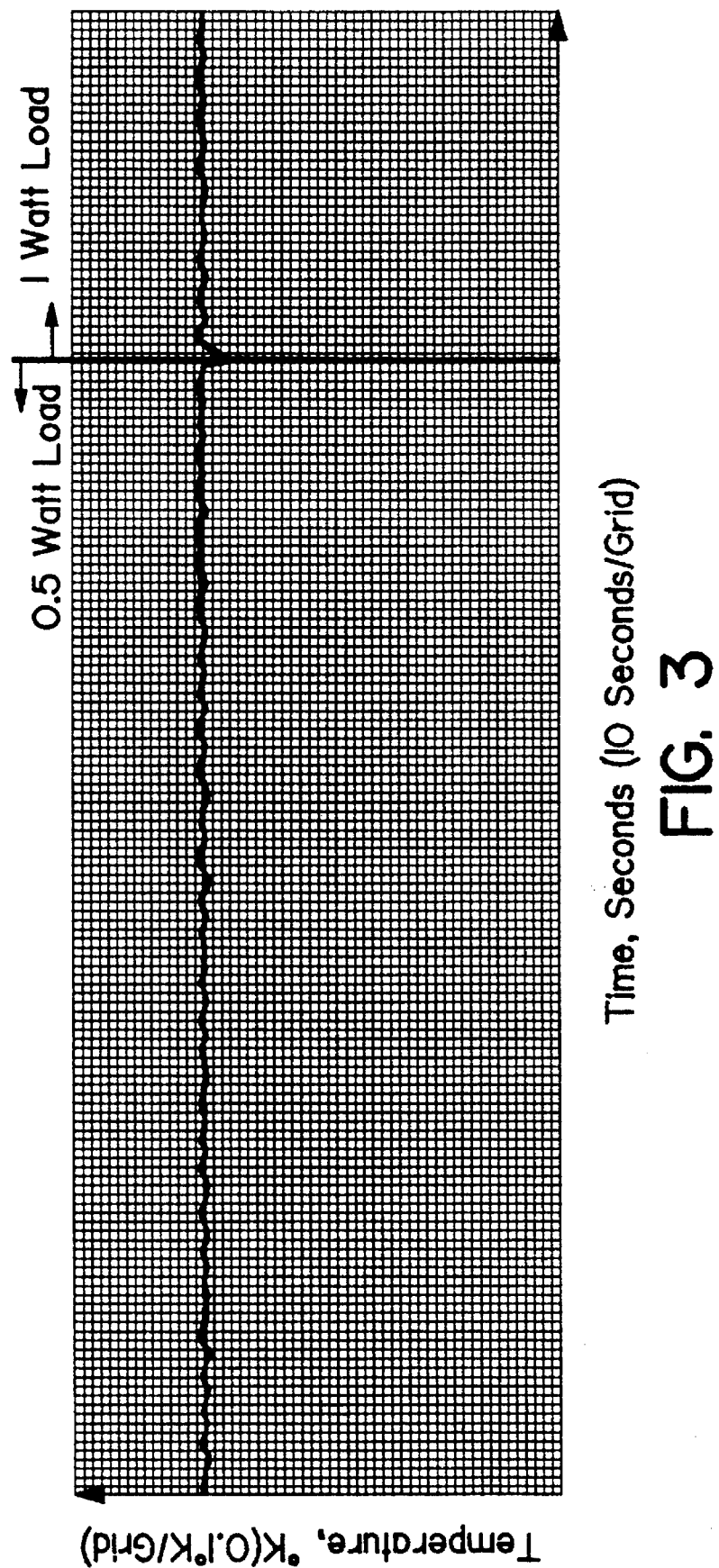
FIG. 3 is a temperature versus time plot showing time response of controlled cold finger tip temperature, constructed in accordance with the embodiment of the present invention.
Figure 4:
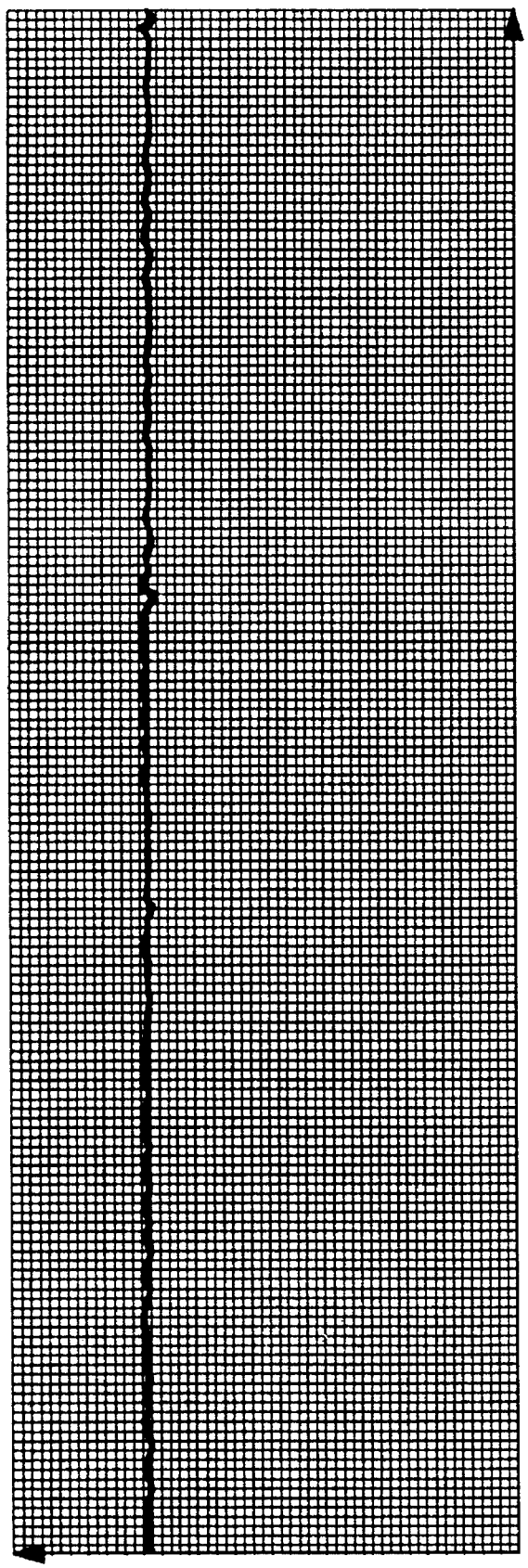
FIG. 4 is a temperature versus time plot showing long term temperature stability of controlled cold finger tip, constructed in accordance with the embodiment of the present invention.

FIG. 3 and FIG. 4 illustrate the time responses of the recorded compressor cold finger tip temperature. FIG. 3 is a temperature versus time plot showing the time response of controlled cold finger tip temperature. FIG. 4 is a temperature versus time plot showing long term temperature stability of controlled cold finger tip, constructed in accordance with the embodiment of the present invention.

During the experiments, a strip chart recorder speed was set to 10 seconds/millimeter. The temperature scale (vertical scale) was chosen to be 0.1 degrees K./millimeter. A vertical line shown in FIG. 3 gives the indication of the occurrence of thermal load change (from 0.5 watt to 1 watt). FIG. 4 shows the temperature stability over a period of 40 minutes.

The above-described experiments have demonstrated that:

(1) Short-term (less than 2 minutes) temperature stability of less than ±0.05 degrees K. had been achieved;

(2) Long-term temperature stability achieved was better than ±0.1 K.;

(3) Temperature settling time for a half a watt load change was less than one minute;

(4) The developed temperature control method of the present invention makes it possible to modify the compressor piston' strokes in order to control the cold finger tip temperature, while maintaining the force balance at the fundamental frequency.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration, which do not constitute departures from the spirit and scope of the present invention.

What is claimed is:

1. A temperature control system for a cryocooler for continuously adjusting compressor piston stroke amplitude as a function of the temperature of a cold finger, so that cryocooler forces are balanced at a compressor fundamental drive frequency, comprising:

input sinusoidal signal means for generating an input sinusoidal signal of a frequency the same as the fundamental frequency of the compressor;

error measuring means for continuously measuring in each cycle of operation a temperature error between a measured cold finger tip temperature and a set temperature;

PID (proportional/integral/derivative) controller means for calculating in each cycle of operation a required stroke amplitude adjustment as a sum of a proportional signal component, a derivative signal component and an integral signal component of the temperature error;

distribution law means for calculating for each compressor piston a compressor stroke amplitude adjustment as a function of said required stroke amplitude adjustment; and combining means for combining in each cycle of operation each said compressor stroke amplitude adjustment with the amplitude of the input sinusoidal signal to produce a corresponding amplitude of a compressor motor stroke command.

2. The temperature control system of a cryocooler defined in claim 1 wherein the distribution law means include a distribution law gain factor for each compressor motor.

3. The temperature control system of a cryocooler defined in claim 1 wherein the distribution law gain factor for each compressor motor is proportional to the amplitude of said compressor motor stroke command.

4. A dual, opposed Stirling-cycle cryocooler, in which temperature is controlled so that cryocooler forces are balanced at a compressor fundamental drive frequency, comprising:

a compressor having two compressor motors and two compressor pistons reciprocated by said compressor motors at a fundamental drive frequency;

a control systems electronics and processors module;

an expander with a cold finger tip having a displacer with a displacer piston;

a balancer located within said expander having a balance mass opposed to said displacer piston;

input sinusoidal signal means for generating an input sinusoidal signal of a frequency the same as the fundamental frequency of the compressor;

error measuring means for continuously measuring in each cycle of operation the temperature error between the temperature measured on the cold finger tip and a set temperature;

PID (proportional/integral/derivative) controller means for calculating in each cycle of operation a required stroke amplitude adjustment as a sum of a proportional signal component, a derivative signal component and an integral signal component of the temperature error;

distribution law means for calculating for each compressor piston a compressor stroke amplitude adjustment as a function of said required stroke amplitude adjustment;

combining means for combining in each cycle of operation each said comppressor stroke amplitude adjustment with the amplitude of the input sinusoidal to compensate for the vibrations of the compressor in order to produce a near perfect force cancellation at the fundamental drive frequency.

5. The dual, opposed Stirling-cycle cryocooler defined in claim 4 wherein the distribution law means include a distribution law gain factor for each compressor motor.

6. The cryocooler defined in claim 4 wherein the distribution law gain factor for each compressor motor is proportional to the amplitude of said compressor motor stroke command.

7. The dual, opposed Stirling-cycle cryocooler defined in claim 4 wherein said temperature error is filtered in a low-pass filter.

8. The dual, opposed Stirling-cycle cryocooler defined in claim 4 wherein said feedback means include a plurality of position servo compressors.

9. The dual, opposed Stirling-cycle cryocooler defined in claim 4 wherein said feedback signal is a commanded fundamental drive signal.

10. The dual, opposed Stirling-cycle cryocooler defined in claim 4 wherein said feedback means further include output sensing means for generating a linear motor LVDT (Linear Variable Displacement Transformer) signal for each said compressor piston.

11. The dual, opposed Stirling-cycle cryocooler defined in claim 4 wherein said feedback means further include an amplitude and phase adjustment for vibration control means for adjusting the amplitude and phase of one of said compressor motors to compensate for the vibrations of the compressor in order to produce a near perfect force cancellation at the fundamental drive frequency.

12. A temperature control method for controlling the temperature of a cryocooler, continuously adjusting compressor piston stroke amplitude as a function of temperature of a cold finger, so that cryocooler forces are balanced at a compressor fundamental drive frequency, said method comprising the following steps:

(a) generating an input sinusoidal signal of a frequency the same as the fundamental frequency of the compressor;

(b) continuously measuring in each cycle of operation the temperature error between a measured cold finger temperature and a set temperature;

(c) calculating in each cycle of operation a required stroke amplitude adjustment as a sum of a proportional signal component, a derivative signal component and an integral signal component of the temperature error;

(d) calculating in a distribution law module for each compressor piston a compressor stroke amplitude adjustment as a function of said required stroke amplitude adjustment; and (e) combining in each cycle of operation each said compressor stroke amplitude adjustment with the amplitude of the input sinusoidal signal to produce a corresponding amplitude of a compressor motor stroke command.

13. The temperature control method in accordance with claim 12 wherein the calculating in distribution law module the compressor stroke amplitude adjustment include calculating of a distribution law gain factor for each compressor motor wherein the distribution law gain factor is proportional to the amplitude of said compressor motor stroke command.

14. A temperature control method for active control of a Stirling-cycle cryocooler cold finger tip temperature, continuously adjusting compressor piston stroke amplitude as a function of temperature error, so that cryocooler forces are balanced at a compressor fundamental drive frequency, said method comprising the following steps:

(a) generating an input sinusoidal signal of a frequency the same as the fundamental frequency of the compressor;

(b) sensing temperature at the cryocooler cold finger tip;

(c) comparing the temperature obtained with a set temperature to produce the temperature error;

(d) inputing the temperature error in a PID controller module which uses proportional, derivative, and integral temperature error information to generate a required compressor stroke amplitude adjustment;

(e) calculating the required compressor stroke amplitude adjustment in a distribution law module that distributes a compressor stroke amplitude adjustment to each compressor motor so that the force balance at the fundamental frequency is maintained;

(f) combining in each cycle of operation each said compressor stroke amplitude adjustment with the amplitude of the input sinusoidal signal to produce a corresponding amplitude of a compressor motor stroke command;

(g) generating a feedback signal in feedback circuit for adjusting the position of each compressor piston in response to the compressor motor stroke command;

(h) varying piston stroke length as a direct function of the cryocooler temperature and the compressor motor stroke command, at the fundamental frequency; and (i) continuously repeating steps (b) to (h).

15. The temperature control method in accordance with claim 14 wherein the calculating in distribution law module the compressor stroke amplitude adjustment includes calculating of a distribution law gain factor for each compressor motor wherein the distribution law gain factor is proportional to the amplitude of said compressor motor stroke command.

16. The temperature control method in accordance with claim 14 wherein said generating the feedback signal in the feedback circuit further include generating a linear motor LVDT (Linear Variable Displacement Transformer) signal for each said compressor piston.

17. The temperature control method in accordance with claim 14 wherein said generating the feedback signal in the feedback circuit further includes adjusting the amplitude and phase of one of said compressor motors to compensate for the vibrations of the compressor in order to produce a near perfect force cancellation at the fundamental drive frequency.

* * * * *